A. B. LOCKHART.

VALVE SPRING COMPRESSOR.

APPLICATION FILED OCT. 6, 1919.

Reissued Apr. 20, 1920. 14,845.

INVENTOR.
A. B. Lockhart,
BY Hazard & Miller
ATTORNEYS.

UNITED STATES PATENT OFFICE.

ANDREW B. LOCKHART, OF REDLANDS, CALIFORNIA.

VALVE-SPRING COMPRESSOR.

14,845. Specification of Reissued Letters Patent. Reissued Apr. 20, 1920.

Original No. 1,266,285, dated May 14, 1918, Serial No. 182,433, filed July 24, 1917. Application for reissue filed October 6, 1919. Serial No. 328,954.

*To all whom it may concern:*

Be it known that I, ANDREW B. LOCKHART, a citizen of the United States, residing at Redlands, in the county of San Bernardino and State of California, have invented a new and useful Valve-Spring Compressor, of which the following is a specification.

The invention relates to a valve spring compressor, and more particularly to the class of tools or devices for facilitating the removal of engine valves.

The primary object of the invention is the provision of a tool or device of this character, wherein the spring for an engine valve, which holds the valve upon its seat, can be readily compressed with despatch for the easy removal of the key from the stem of the valve to permit the extracting of said valve from its casing, so that the said valve or seat may be conveniently ground.

Another object of the invention is the provision of a tool or device of this character, which can be readily applied and adjusted, and also will be positive in operation, to sustain the spring in any desired degree of compression, without manual exertion for this purpose, and avoiding the possibility of the bending of the stem of the valve, the tool being readily operated and the leverage giving a powerful compression force and assuring ease in operation.

A further object of the invention is the provision of a tool or device of this character, which is extremely simple in construction, readily and easily operated, strong, yet light in weight, durable, thoroughly reliable and efficient in its operation, and inexpensive in manufacture.

With these and other objects in view, the invention consists in the features of construction, combination and arrangement of parts, as will be hereinafter fully described, illustrated in the accompanying drawings, and pointed out in the claims hereunto appended. However, it is to be understood that changes, variations and modifications may be made such as come properly within the scope of the appended claims, without departing from the spirit of the invention or sacrificing any of its advantages.

In the accompanying drawing.

Similar reference characters indicate like parts throughout the several figures.

Figure 1:
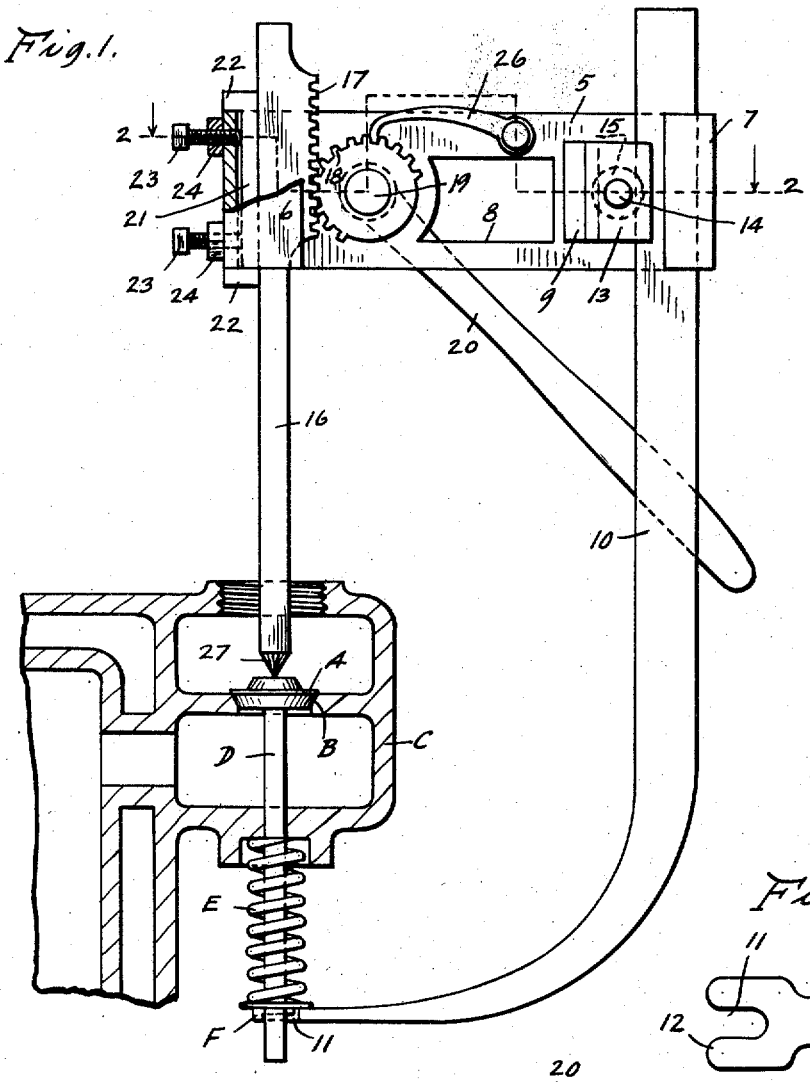
Figure 1 is a fragmentary vertical sectional view, through a valve casing, showing in side elevation the tool or device constructed in accordance with the invention applied, a portion of the latter being in section.
Figure 3:
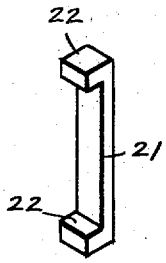
Fig. 3 is a perspective view of the adjustable gib.
Figure 4:
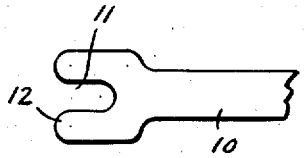
Fig. 4 is a fragmentary detail view, showing in top plan the forked end of the lever.
Figure 2:
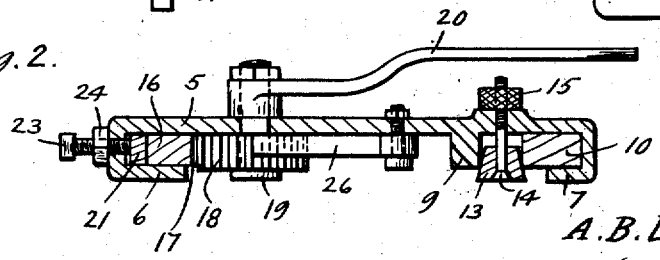
Fig. 2 is a sectional view on the line 2—2 of Fig. 1, looking in the direction of the arrow.

In constructing a practical embodiment of the invention in accordance with the illustrated example, the frame 5 is provided, preferably comprising a single plate which is bent on itself at opposite ends into substantially U-formation to constitute guides or cleats 6 and 7, respectively, the plate being preferably cut away, as at 8, at an unoccupied portion or portions to assure lightness or the reduction in weight thereof without weakening the same, and spaced from the guide or cleat 7 on the frame is a raised portion providing an abutment rib 9, which extends transversely of the plate parallel with the free edge of the guide or cleat 7 for a purpose presently described.

Slidably engaged in the guide or cleat 7 on the frame 5 is the vertical adjustable leg of a substantially L-shaped arm 10, the horizontal leg of which is flattened and bifurcated at 11 to form a forked terminal 12 and adapted to engage the vertical leg of the arm 10 is a wedging block 13, which is inserted between the rib 9 and the edge adjacent thereto of the arm 10 when engaged in the guide or cleat 7, so that the arm can be locked or held fast in adjusted position. Passed through the block 13 is a bolt 14, which is also passed through the frame 5 and carried a knurled nut 15, which tightens against the frame 5, and in the use of the bolt and nut, the block 13 can be wedged between the rib 9 and the vertical leg of the arm 10 for securely holding the arm in adjusted position, as will be obvious.

Slidably fitted in the guide or cleat 6 on the frame 5 is a centering pin 16, which is formed with a toothed rack 17 meshing with a segment gear 18. Rotatably journaled at one side of the frame 5, the journal 19 of which is passed through the frame, has fixed thereto an operating handle 20 at the other side of the frame, so that the gear can be manually rotated for the operation of the tool or device. Fitted within the guide or cleat 6 is an adjustable gib 21, which, at the ends thereof is formed with right angular ears 22 to engage with opposite edges of the guide or cleat 6 at the closed side thereof to prevent displacement longitudinally of said gib within the rib or cleat, and threaded in the closed side of the guide or cleat are square headed adjusting screws 23, which work against the gib 21 for adjusting the same against the rack end portion 17 of the centering pin 16, so as to take up wear and assure of the positive meshing of the rack teeth 17 with the gear 18, the screws 23 being fitted with lock nuts 24, which secure the same in their adjusted position.

In Fig. 1 of the drawing there is illustrated a valve A engaging a valve seat B in the valve casing C, the stem D of the valve B being slidable through the casing C and surrounding this stem is the coiled spring E which sustains the valve A closed and engaged in its seat B, the spring E being held active upon the stem through the medium of the retaining key F as usual.

Pivotally mounted on the frame 5 is a dog or pawl 26 for engagement with the gear 18, so as to lock the same to sustain the arm 10 in raised or lowered position relative to the pin 16 on movement of the frame 5 when the handle 20 has been actuated by the user of the device.

Now, in the application of the tool or device, the handle 20 for operating the gear 18 is brought to the position shown in Fig. 1 of the drawing, and the centering pin 16 which at its engaging end is formed with a point 27 is engaged with the valve A in the center thereof, the point 27 being engaged in the usual central depression in said valve to prevent the slipping of the centering pin, and the arm 10 at its forked extremity 12 receives in the bifurcation 11 the lower end of the stem D of said valve A, so that the tool or device is in the position shown in Fig. 1 of the drawing to be operated for compressing the spring E for the removal of the retaining key F from the valve stem D, so that the valve can be extracted from the valve casing C for the grinding of the valve or its seat B in said casing. On raising the handle 20, the gear 18 is rotated and the frame 5 is moved upwardly on the rack end 17 of the centering pin 16, it being understood, of course, that the arm 10 is secured in its adjusted position and this movement of the frame upwardly compresses the spring E to a sufficient degree for permitting the easy removal of the retaining key F from the stem D of the valve A, so that the valve can be readily removed from the casing C on releasing the tool or device from the valve and its stem.

From the foregoing, it is thought that the construction and manner of operation of the invention will be clearly understood, and, therefore, a more extended explanation has been omitted.

What is claimed is:—

1. A tool of the character described comprising a plate-like frame formed with guide cleats at opposite ends, a substantially L-shaped arm slidably received in one of the cleats and having a forked terminal, a wedging fastener carried by the frame and engageable with the arm to hold the same in adjusted position thereon, a toothed rack slidable in the other cleat and having a centering pin, a gear rotatably journaled on the frame and meshing with the toothed rack, and a handle for rotating the gear.

2. A tool of the character described comprising a plate-like frame formed with guide cleats at opposite ends, a substantially L-shaped arm slidably received in one of the cleats and having a forked terminal, a wedging fastener carried by the frame and engageable with the arm to hold the same in adjusted position thereon, a toothed rack slidable in the other cleat and having a centering pin, a gear rotatably journaled on the frame and meshing with the toothed rack, a handle for rotating the gear, and an adjustable gib acting against the toothed rack and held within the cleat receiving the same.

3. A tool of the character described comprising a plate-like frame formed with guide cleats at opposite ends, a substantially L-shaped arm slidably received in one of the cleats and having a forked terminal, a wedging fastener carried by the frame and engageable with the arm to hold the same in adjusted position thereon, a toothed rack slidable in the other cleat and having a centering pin, a gear rotatably journaled on the frame and meshing with the toothed rack, a handle for rotating the gear, an adjustable gib acting against the toothed rack and held within the cleat receiving the same, and means for locking the gear against movement.

4. A tool of the character described, comprising a frame formed with guides at opposite ends, a substantially L-shaped arm slidably received in one of the guides and having a forked terminal, a fastener carried by the frame and engageable with the arm to hold the same in adjusted position thereon, a toothed rack slidable in the other guide and having a centering pin, a gear rotatably journaled on the frame and meshing with the toothed rack, and a handle for rotating the gear.

5. A tool of the character described, comprising a frame formed with guide cleats at opposite ends, a substantially L-shaped arm slidably received in one of the cleats and having a forked terminal, a fastener carried by the frame and engageable with the arm to hold the same in adjusted position thereon, a toothed rack slidable in the other cleat and having a centering pin, a gear rotatably journaled on the frame and meshing with the toothed rack, and a handle for rotating the gear.

In testimony that I claim the foregoing as my own I have hereto affixed my signature in the presence of two witnesses.

ANDREW B. LOCKHART.

Witneses:
HAZEL E. JONES,
FRANCIS P. MURPHY.